(12) United States Patent
Ramanna et al.

(10) Patent No.: US 11,245,669 B1
(45) Date of Patent: Feb. 8, 2022

(54) FIREWALL FILTER COMPRISING ONE OR MORE OBJECTS

(71) Applicant: Juniper Networks, Inc., Sunnyvale, CA (US)

(72) Inventors: Sandeep Hassan Ramanna, Sunnyvale, CA (US); Vinod B C, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 159 days.

(21) Appl. No.: 16/572,363

(22) Filed: Sep. 16, 2019

(51) Int. Cl.
*H04L 29/06* (2006.01)

(52) U.S. Cl.
CPC ...... *H04L 63/0263* (2013.01); *H04L 63/0245* (2013.01)

(58) Field of Classification Search
CPC . H04L 63/0263; H04L 63/0245; H04L 63/02; H04L 63/0227; H04L 63/101; H04W 12/088; H04W 12/08; G06F 8/65
USPC .......................................................... 726/13
See application file for complete search history.

(56) References Cited

U.S. PATENT DOCUMENTS

| | | | | |
|---|---|---|---|---|
| 6,243,815 B1* | 6/2001 | Antur | ................. | H04L 41/0806 709/220 |
| 8,132,251 B2* | 3/2012 | Pennec | ............... | H04L 63/0272 726/13 |
| 8,589,904 B2* | 11/2013 | Powell | .................... | G06F 8/656 717/170 |
| 10,382,258 B2* | 8/2019 | Tang | ................... | H04L 41/0803 |
| 2007/0016953 A1* | 1/2007 | Morris | .................. | G06F 21/577 726/24 |
| 2010/0180331 A1* | 7/2010 | Murakami | .............. | G06F 21/55 726/11 |
| 2011/0035740 A1* | 2/2011 | Powell | .................... | G06F 8/656 717/170 |
| 2013/0138979 A1* | 5/2013 | Wang | ....................... | G06F 1/26 713/300 |
| 2014/0189086 A1* | 7/2014 | Chattopadhyay | ... | H04L 41/0873 709/223 |
| 2016/0072770 A1* | 3/2016 | Crane | ................. | H04L 63/0281 726/22 |
| 2017/0004192 A1* | 1/2017 | Masurekar | .......... | H04L 63/0218 |
| 2017/0286099 A1* | 10/2017 | Wilkinson | ............... | G06F 8/71 |
| 2017/0317979 A1* | 11/2017 | Bansal | ............... | H04L 63/0263 |
| 2018/0007008 A1* | 1/2018 | Bansal | ............... | G06F 12/0875 |
| 2019/0253390 A1* | 8/2019 | Tiagi | .................. | H04L 63/0236 |
| 2020/0314197 A1* | 10/2020 | Chandra | .................. | G06F 9/54 |

* cited by examiner

*Primary Examiner* — Farid Homayounmehr
*Assistant Examiner* — Sanchit K Sarker
(74) *Attorney, Agent, or Firm* — Harrity & Harrity, LLP

(57) ABSTRACT

A device may determine, based on one or more first objects of a first version of a firewall filter, a set of first firewall rules and may determine, based on one or more second objects of a second version of the firewall filter, a set of second firewall rules. The device may determine, based on the set of first firewall rules and the set of second firewall rules, modification information related to the firewall filter, wherein the modification information indicates at least one difference between the set of first firewall rules and the set of second firewall rules. The device may identify, based on the modification information, at least one object, of the one or more first objects or the one or more second objects, is a modification or has been added or deleted and may send the at least one object to an additional device.

20 Claims, 11 Drawing Sheets

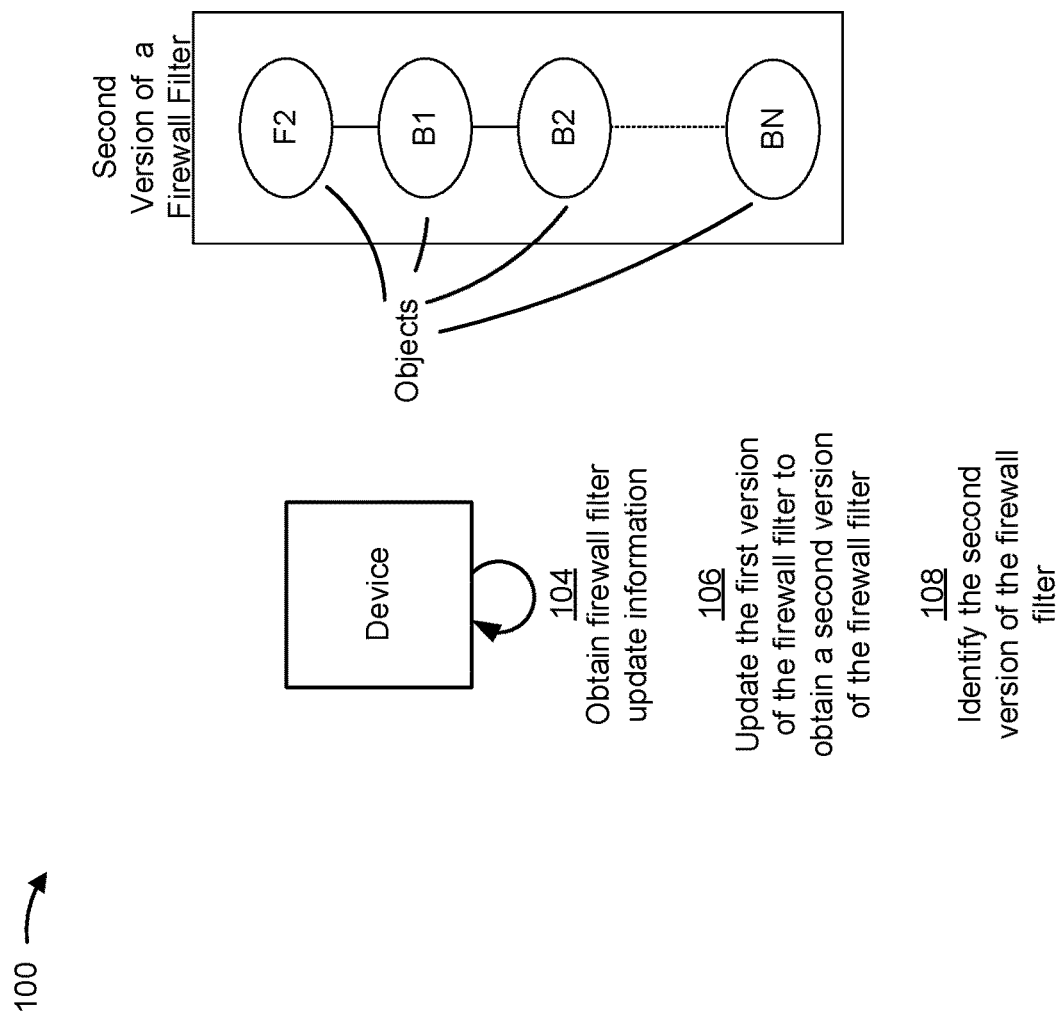

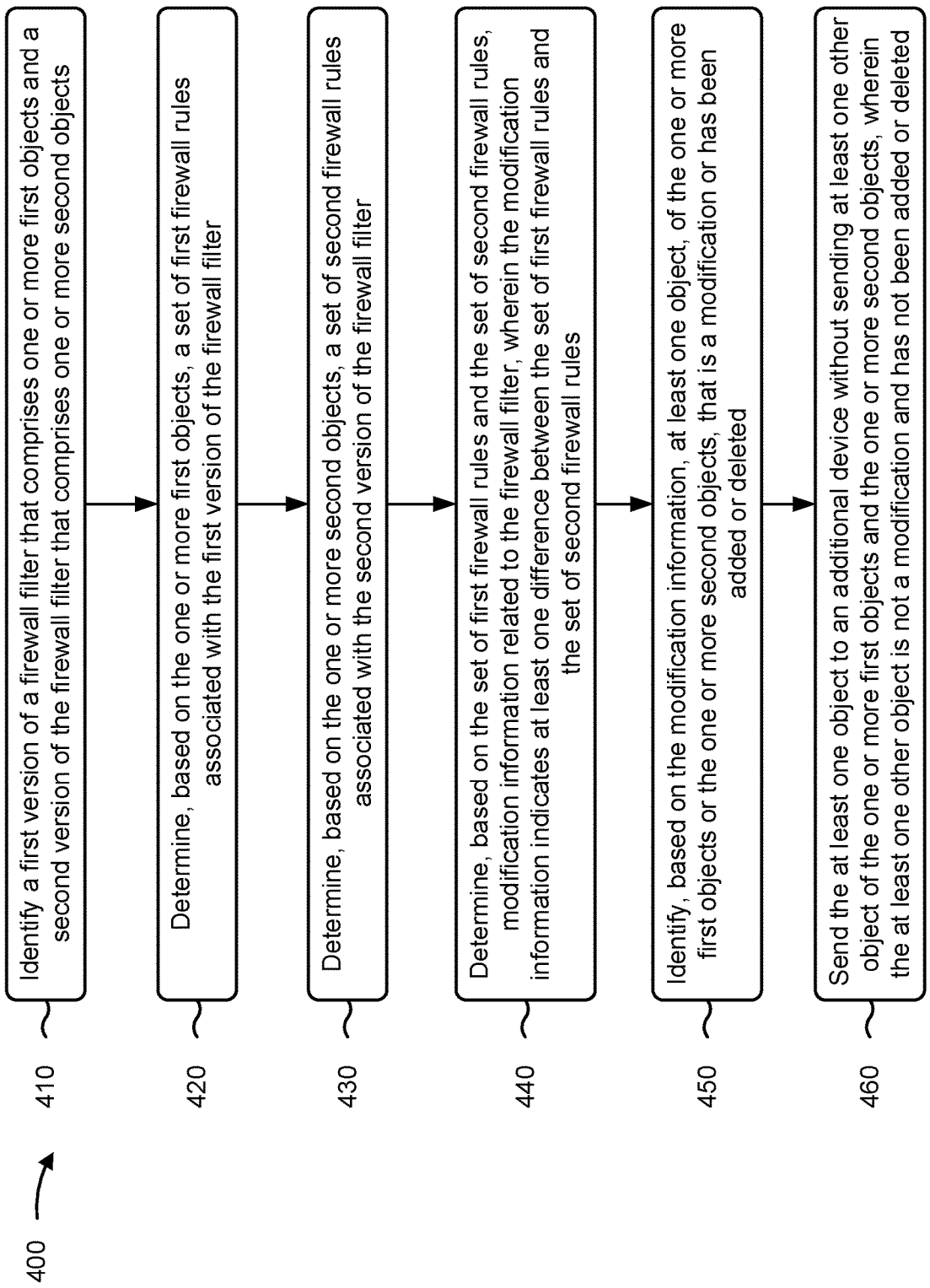

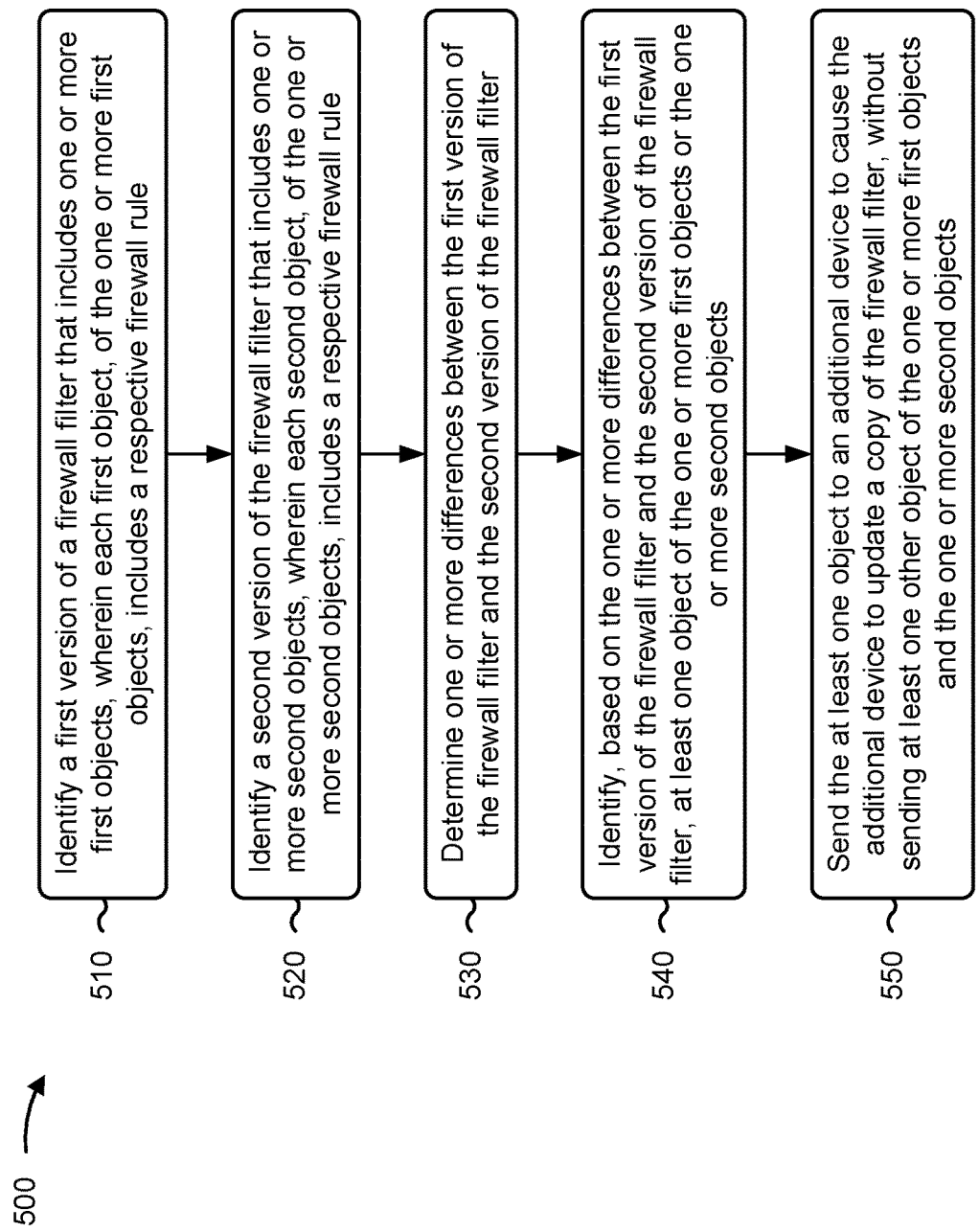

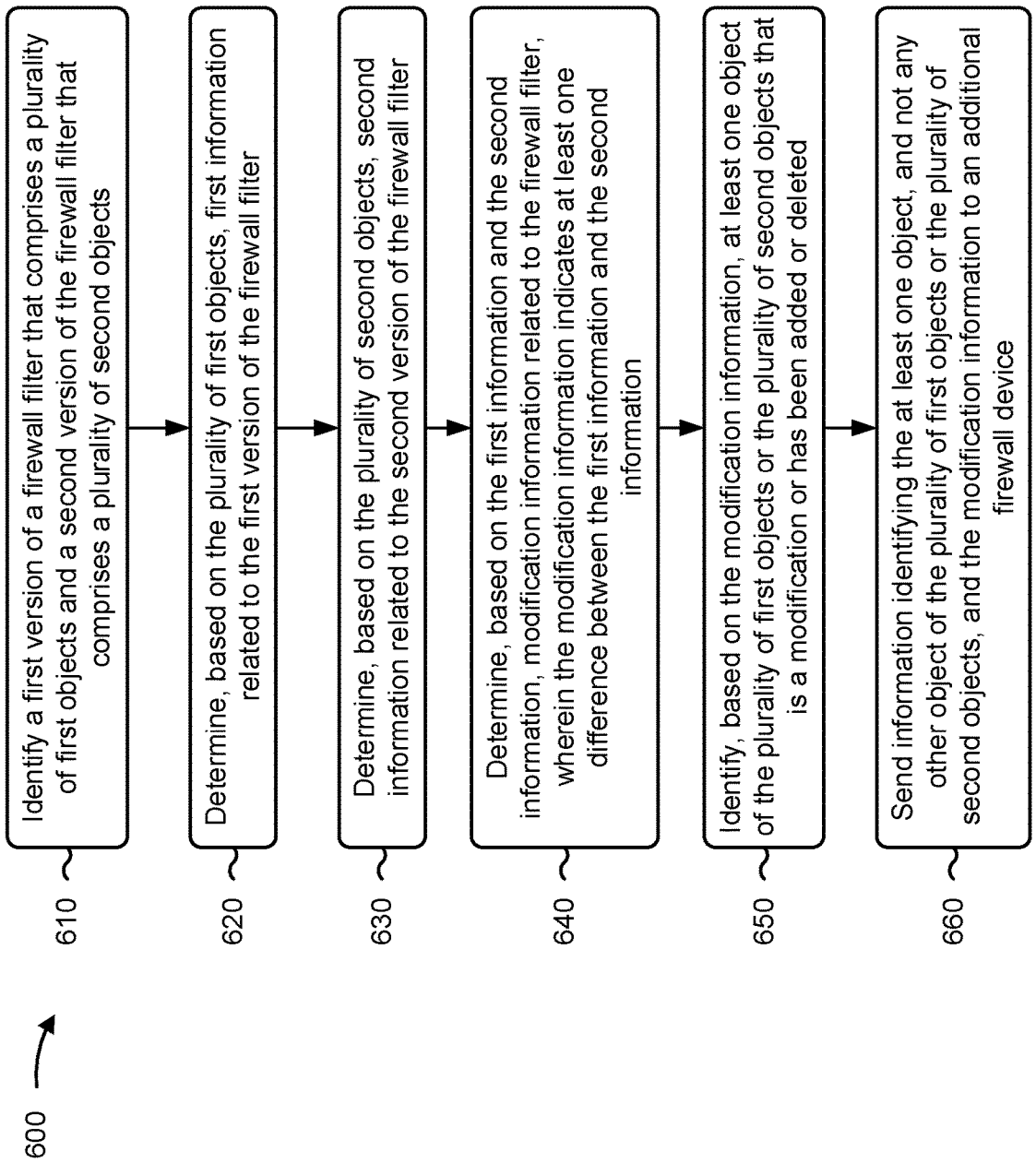

FIREWALL FILTER COMPRISING ONE OR MORE OBJECTS

BACKGROUND

A firewall monitors network traffic that passes through the firewall and may perform actions, such as denying or permitting passage of the traffic, based on one or more firewall rules. A firewall may be implemented as a stand-alone network device or integrated in a single network device, such as a router or switch, which performs other functions. For example, a network switch may perform firewall related functions as well as switching functions.

SUMMARY

According to some implementations, a method may include identifying, by a device, a first version of a firewall filter that comprises one or more first objects and a second version of the firewall filter that comprises one or more second objects; determining, by the device and based on the one or more first objects, a set of first firewall rules associated with the first version of the firewall filter; determining, by the device and based on the one or more second objects, a set of second firewall rules associated with the second version of the firewall filter; determining, by the device and based on the set of first firewall rules and the set of second firewall rules, modification information related to the firewall filter, wherein the modification information indicates at least one difference between the set of first firewall rules and the set of second firewall rules; identifying, by the device and based on the modification information, at least one object, of the one or more first objects or the one or more second objects, that is a modification or has been added or deleted; and sending, by the device, the at least one object to an additional device without sending at least one other object of the one or more first objects and the one or more second objects, wherein the at least one other object is not a modification and has not been added or deleted.

According to some implementations, a device may include one or more memories; and one or more processors to: identify a first version of a firewall filter that includes one or more first objects, wherein each first object, of the one or more first objects, includes a respective firewall rule; identify a second version of the firewall filter that includes one or more second objects, wherein each second object, of the one or more second objects, includes a respective firewall rule; determine one or more differences between the first version of the firewall filter and the second version of the firewall filter; identify, based on the one or more differences between the first version of the firewall filter and the second version of the firewall filter, at least one object of the one or more first objects or the one or more second objects; and send the at least one object to an additional device to cause the additional device to update a copy of the firewall filter without sending at least one other object of the one or more first objects and the one or more second objects.

According to some implementations, a non-transitory computer-readable medium may store one or more instructions. The one or more instructions, when executed by one or more processors of a firewall device, may cause the one or more processors to: identify a first version of a firewall filter that comprises a plurality of first objects and a second version of the firewall filter that comprises a plurality of second objects; determine, based on the plurality of first objects, first information related to the first version of the firewall filter; determine, based on the plurality of second objects, second information related to the second version of the firewall filter; determine, based on the first information and the second information, modification information related to the firewall filter, wherein the modification information indicates at least one difference between the first information and the second information; identify, based on the modification information, at least one object of the plurality of first objects or the plurality of second objects that is a modification or has been added or deleted; and send information identifying the at least one object, and not any other object of the plurality of first objects or the plurality of second objects, and the modification information to an additional firewall device.

BRIEF DESCRIPTION OF THE DRAWINGS

FIGS. 1A-1E are diagrams of example implementations described herein.

FIGS. 4-6 are flowcharts of example processes for a firewall filter comprising one or more objects.

DETAILED DESCRIPTION

Figure 1A:
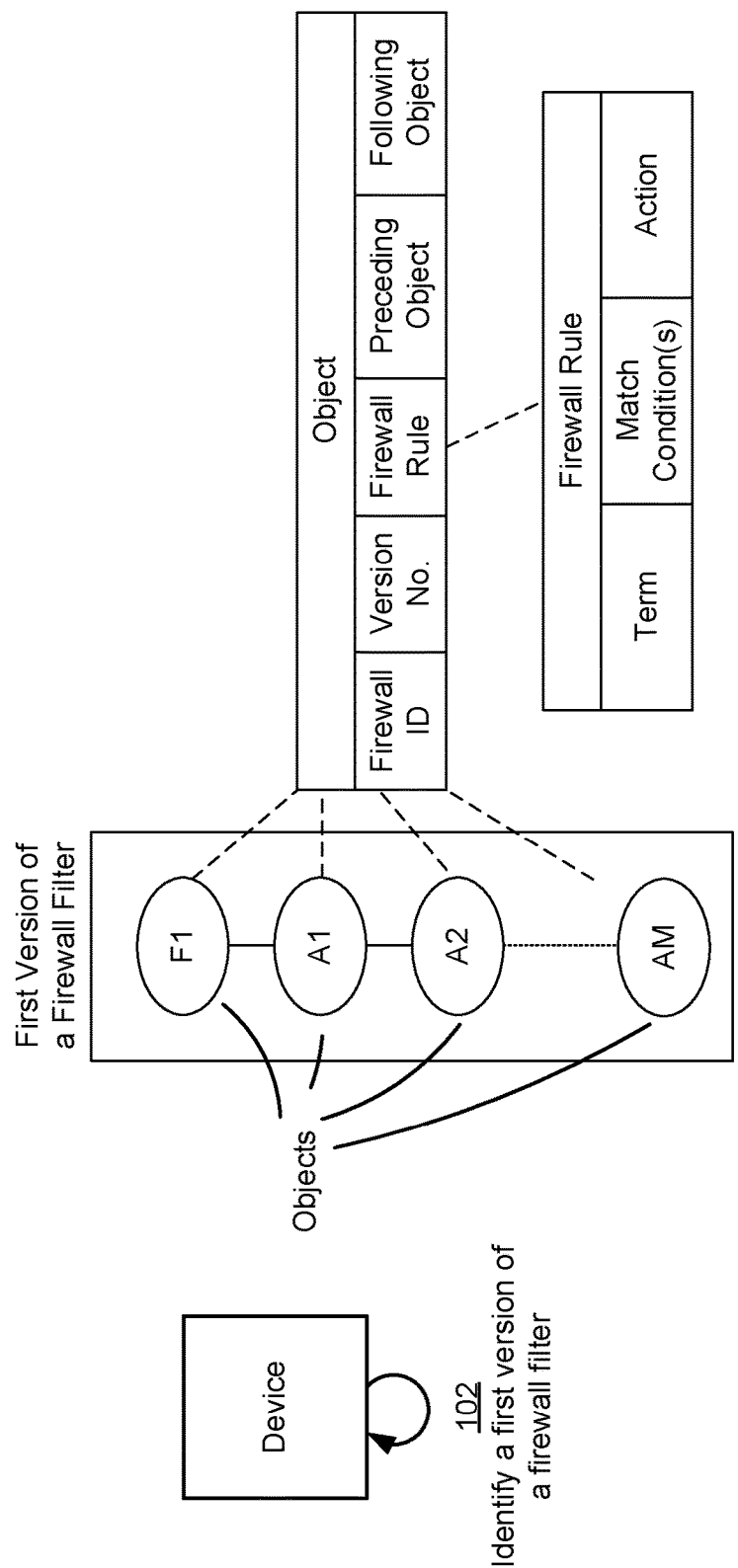

The following detailed description of example implementations refers to the accompanying drawings. The same reference numbers in different drawings may identify the same or similar elements.

A network device may use a firewall filter to scan and/or filter traffic (e.g., comprised of one or more packets) that flows through the network device. The firewall filter may comprise a plurality of firewall rules (e.g., a plurality of terms that are associated with a set of match criteria (e.g., used to analyze the one or more packets of the traffic) and a set of actions to be carried out if the match criteria are satisfied). The network device may maintain the firewall filter as a list, a table, or a similar type of data structure. In many cases, one or more of the firewall rules of the firewall filter may be modified, one or more firewall rules of the firewall filter may be deleted, or one or more new firewall rules may be added to the firewall filter. This is sometimes referred to as updating the firewall filter from a first version to a second version.

In some cases, the network device may share the second version of the firewall filter with an additional device (e.g., another network device) so that the additional device may update a copy of the firewall filter from the first version to the second version. In such cases, the entire second version of the firewall filter (e.g., the entire list of firewall rules included in the second version of the firewall filter) may be sent from the network device to the additional device, even though modifications, deletions, and/or additions to the firewall filter may have affected only some of the firewall rules of the firewall filter. Sending the entire second version of the firewall filter in this way may require a substantial, inefficient use of resources (e.g., processing resources, memory resources, power resources, networking resources, and/or the like) of the network device and/or the additional device. Moreover, repeatedly and/or frequently sending the entire second version of the firewall filter to multiple additional devices may compound the inefficient use of the resources.

Some implementations described herein provide a device that maintains a firewall filter as one or more objects that respectively include one or more firewall rules (e.g., instead of a list of firewall rules). In some implementations, the device may identify a first version of the firewall filter that comprises one or more first objects and a second version of the firewall filter that comprises one or more second objects. In some implementations, the device may determine one or more differences between the first version of the firewall filter and the second version of the firewall filter and thereby identify at least one object, of the one or more first objects or the one or more second objects, that is a modification or has been deleted and/or added to the firewall filter. In some implementations, the device may send the at least one object to an additional device to cause the additional device to update the copy of the firewall filter from the first version to the second version.

Accordingly, in some implementations, the device sends modified, deleted, and/or added objects to the additional device without sending objects that have not been modified, added, or deleted. In this way, the device only sends updated firewall rules to the additional device, rather than an entire list of firewall rules that includes updated and not updated firewall rules. Thus, some implementations described herein may reduce an amount of resources (e.g., processing resources, memory resources, power resources, networking resources, and/or the like) of the device and/or the additional device that are used to send updated firewall rule information from the device to the additional device than would otherwise be used (e.g., to send an entire list of firewall rules). This may also reduce an amount of resources and/or time that the additional device needs to update a copy of the firewall filter (e.g., because the additional device only needs to process one or more objects instead of an entire list).

FIGS. 1A-1E are diagrams of one or more example implementations 100 described herein. As shown in FIGS. 1A-1E, example implementation(s) 100 may include a device and an additional device. The device and/or the additional device may each include various types of network devices, such as a router, a gateway, a switch, a bridge, a wireless access point, a base station, a spine, a firewall, and/or the like. The device and/or the additional device may be included in a network, such as a cellular network, a local area network (LAN), a core network, an access network, a wide area network (WAN) such as the Internet, a cloud network, and/or the like.

As shown in FIG. 1A and by reference number 102, the device may identify and/or determine a first version of a firewall filter. For example, the first version of the firewall filter may be stored in a data structure (e.g., a data structure included in the device or a data structure accessible to the device via the network) and the device may access the data structure to identify and/or determine the first version of the firewall filter. The first version of the firewall filter may be a current version of the firewall filter (e.g., an applied version of the firewall filter) that the device uses to monitor traffic (e.g., one or more packets) routed through the device.

As shown in FIG. 1A, the first version of the firewall filter may comprise one or more objects. In some implementations, the one or more objects may be in a sequential priority order, which means that a first object that precedes a second object in the sequential priority order has a higher position than the second object (e.g., the device will apply the at least one firewall rule included in the first object before the at least one firewall rule included in the second object). Moreover, an object may be considered to be adjacent to a different object in the sequential priority order if the object precedes or follows the different object in the sequential priority order.

As shown in FIG. 1A, an object may include one or more parameters, such as information identifying the firewall filter (e.g., a "Firewall ID" parameter) that includes the object, information indicating the version of the firewall filter (e.g., a "Version No." parameter) that includes the object, at least one firewall rule (e.g., a "Firewall Rule" parameter), information that identifies a preceding object that is before the object in the sequential priority order (e.g., a "Preceding Object" parameter), information that identifies a following object that is after the object in the sequential priority order (e.g., a "Following Object" parameter), and/or the like. As shown in FIG. 1A, a firewall rule may include a term, at least one match condition, and an action. The term may be an identifier for the firewall rule. The at least one match condition may specify packet filtering criteria (e.g., one or more match statement strings). The action may indicate an action that a firewall is to perform when the packet filtering criteria are satisfied (e.g., accept a packet, discard a packet, count a packet, and/or the like).

As shown in FIG. 1A, an example first version of the firewall filter comprises an object F1 and objects A1 through AM (where M is greater than or equal to 3). Object F1 and objects A1 through AM may be in a sequential priority order. For example, as shown in the example first version of the firewall filter in FIG. 1A, object F1 precedes object A1, which precedes object A2, and/or the like.

Object F1 is a header object (e.g., an object with the highest priority in the sequential priority order) that provides a beginning point for objects A1 through AM in the sequential priority order. Object F1 may include one or more parameters, such as information identifying the firewall filter, information indicating the first version of the firewall filter, and/or information that identifies a following object (e.g., object A1) that is after the object F1 in the sequential priority order. Further, object A1 may include one or more parameters, such as information identifying the firewall filter, information indicating the first version of the firewall filter, at least one firewall rule, information that identifies a preceding object that is before object A1 in the sequential priority order (e.g., object F1), and/or information that identifies a following object that is after object A1 in the sequential priority order (e.g., object A2). Objects A2 through AM may include similar parameters as object A1.

As shown in FIG. 1B and by reference number 104, the device may obtain firewall filter update information. For example, a user may interact with a user interface of the device to input the firewall filter update information into the device. As another example, the device may communicate with another device, such as a server device, to obtain the firewall filter update information. The firewall filter update information may indicate one or more firewall rules of the first version of the firewall filter to modify, one or more firewall rules to add to the first version of the firewall filter, one or more firewall rules to delete from the first version of the firewall filter, and/or the like.

As shown in reference number 106, the device may update the first version of the firewall filter to obtain a second version of the firewall filter. For example, the device may process the firewall filter update information to update the first version of the firewall filter to obtain a second version of the firewall filter. The second version of the firewall filter may be stored separately from the first version of the firewall filter in the data structure (e.g., the data structure included in the device or the data structure accessible to the device via the network). The second version of the firewall filter may be an updated version of the first firewall filter that has not yet been implemented (e.g., the second version of the firewall filter may not be currently used to monitor traffic routed through the device).

Additionally, or alternatively, a different device, such as a server device, may update the first version of the firewall filter to obtain the second version of the firewall filter, such that the device may not need to obtain firewall filter update information and/or update the first version of the firewall filter as described herein.

As shown by reference number by reference number 108, the device may identify and/or determine the second version of the firewall filter. For example, the device may access the data structure to identify and/or determine the second version of the firewall filter.

As similarly described herein in relation to the first version of the firewall filter, the second version of the firewall filter may comprise one or more objects (e.g., one or more objects in a sequential priority order) that respectively include one or more parameters. For example, as shown in FIG. 1B, an example second version of the firewall filter comprises an object F2 and objects B1 through BN (where N is greater than or equal to 3) that may be in a sequential priority order. Object F2 is a header object that provides a beginning point for objects B1 through BN in the sequential priority order. Object F2 may include one or more parameters, such as information identifying the firewall filter, information indicating the second version of the firewall filter, and/or information that identifies a following object (e.g., object B1) that is after the object F2 in the sequential priority order. Further, object B1 may include one or more parameters, such as information identifying the firewall filter, information indicating the second version of the firewall filter, at least one firewall rule, information that identifies a preceding object that is before object B1 in the sequential priority order (e.g., object F2), and/or information that identifies a following object that is after object B1 in the sequential priority order (e.g., object B2). Objects B2 through BN may include parameters similar to those of object B1.

In some implementations, at least some of the one or more objects of the second version of the firewall filter may be the same as at least some of the one or more objects of the first version of the firewall filter and/or may be modifications of at least some of the one or more objects of the first version of the firewall filter. Additionally, or alternatively, at least some of the one or more objects of the second version of the firewall filter may not correspond to any object of the one or more objects of the first version of the firewall filter (e.g., one or more new objects may have been added to the firewall filter). Additionally, or alternatively, at least some of the one or more objects of the first version of the firewall filter may not correspond to any object of the one or more objects of the second version of the firewall filter (e.g., one or more objects may have been deleted from the firewall filter).

Figure 1C:
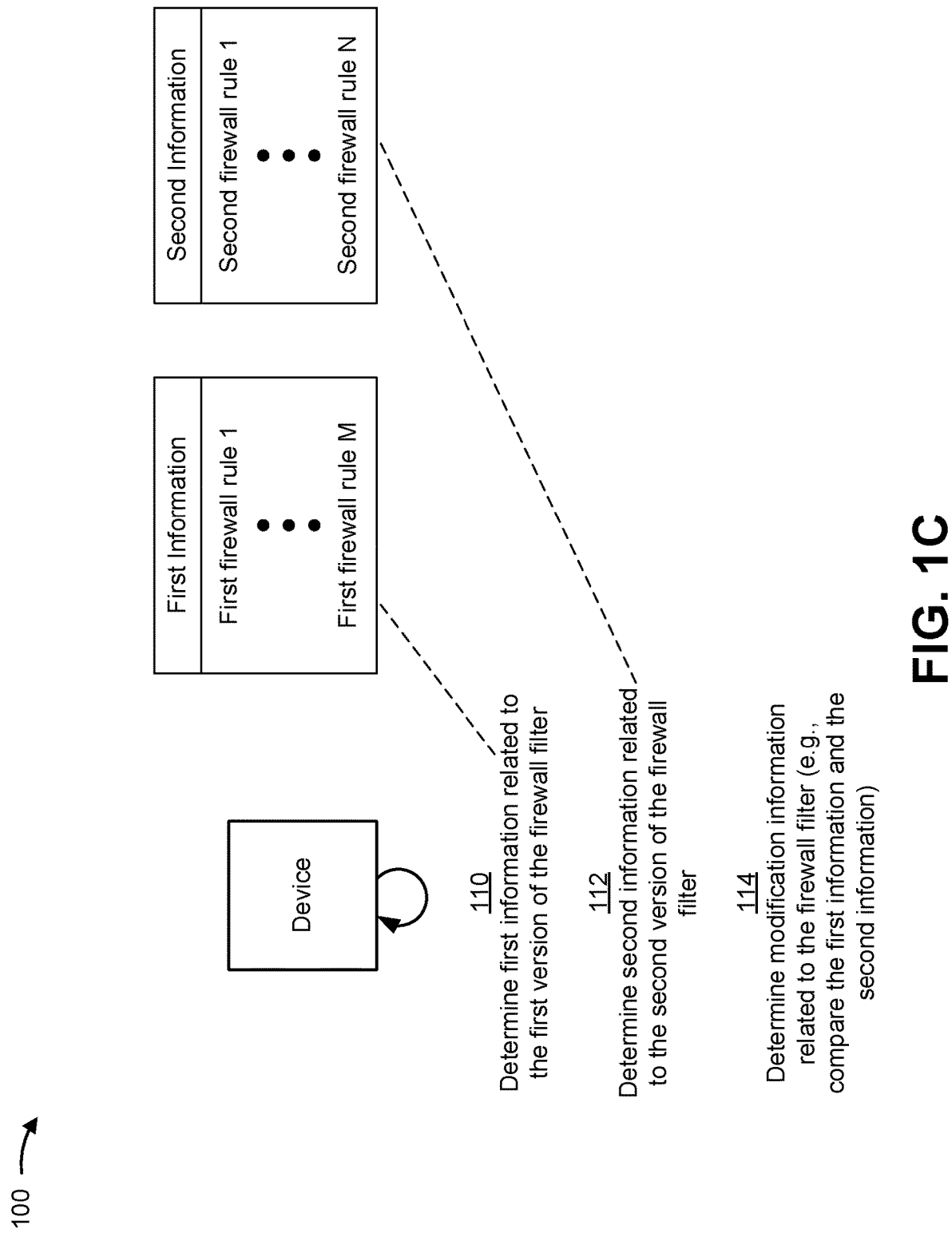

As shown in FIG. 1C and by reference number 110, the device may identify and/or determine first information related to the first version of the firewall filter. The first information may identify a set of firewall rules (hereinafter referred to as "the set of first firewall rules") included in the first version of the firewall filter. For example, the device may process (e.g., parse) the one or more objects included in the first version of the firewall filter (hereinafter referred to as "the one or more first objects") to determine at least one respective first firewall rule associated with each first object of the one or more first objects.

As shown by reference number 112, the device may identify and/or determine second information related to the second version of the firewall filter. The second information may identify a set of firewall rules (hereinafter referred to as "the set of second firewall rules") included in the second version of the firewall filter. For example, the device may process (e.g., parse) the one or more objects included in the second version of the firewall filter (hereinafter referred to as "the one or more second objects") to determine at least one respective second firewall rule associated with each second object of the one or more second objects.

As shown by reference number 114, the device may determine modification information related to the firewall filter. For example, the device may compare the set of first firewall rules and the set of second firewall rules to identify one or more differences between the set of first firewall rules and the set of second firewall rules (e.g., to identify one or more differences between the first version of the firewall filter and the second version of the firewall filter).

For example, the device may determine that a second firewall rule, of the set of second firewall rules, is a modification of a first firewall rule of the set of first firewall rules. As another example, the device may determine that a first firewall rule does not correspond to any second firewall rule of the set of second firewall rules. This may indicate that the first firewall rule was deleted when the firewall filter was updated from the first version to the second version. In a further example, the device may determine that a second firewall rule does not correspond to any first firewall rule of the set of first firewall rules. This may indicate that the second firewall rule was added when the firewall filter was updated from the first version to the second version.

The modification information may indicate the one or more differences between the set of first firewall rules and the set of second firewall rules. For example, modification information may indicate that a second firewall rule is a modification of a first firewall rule; a first firewall rule does not correspond to any second firewall rule of the set of second firewall rules; a second firewall rule does not correspond to any first firewall rule of the set of first firewall rules; and/or the like.

Figure 1D:
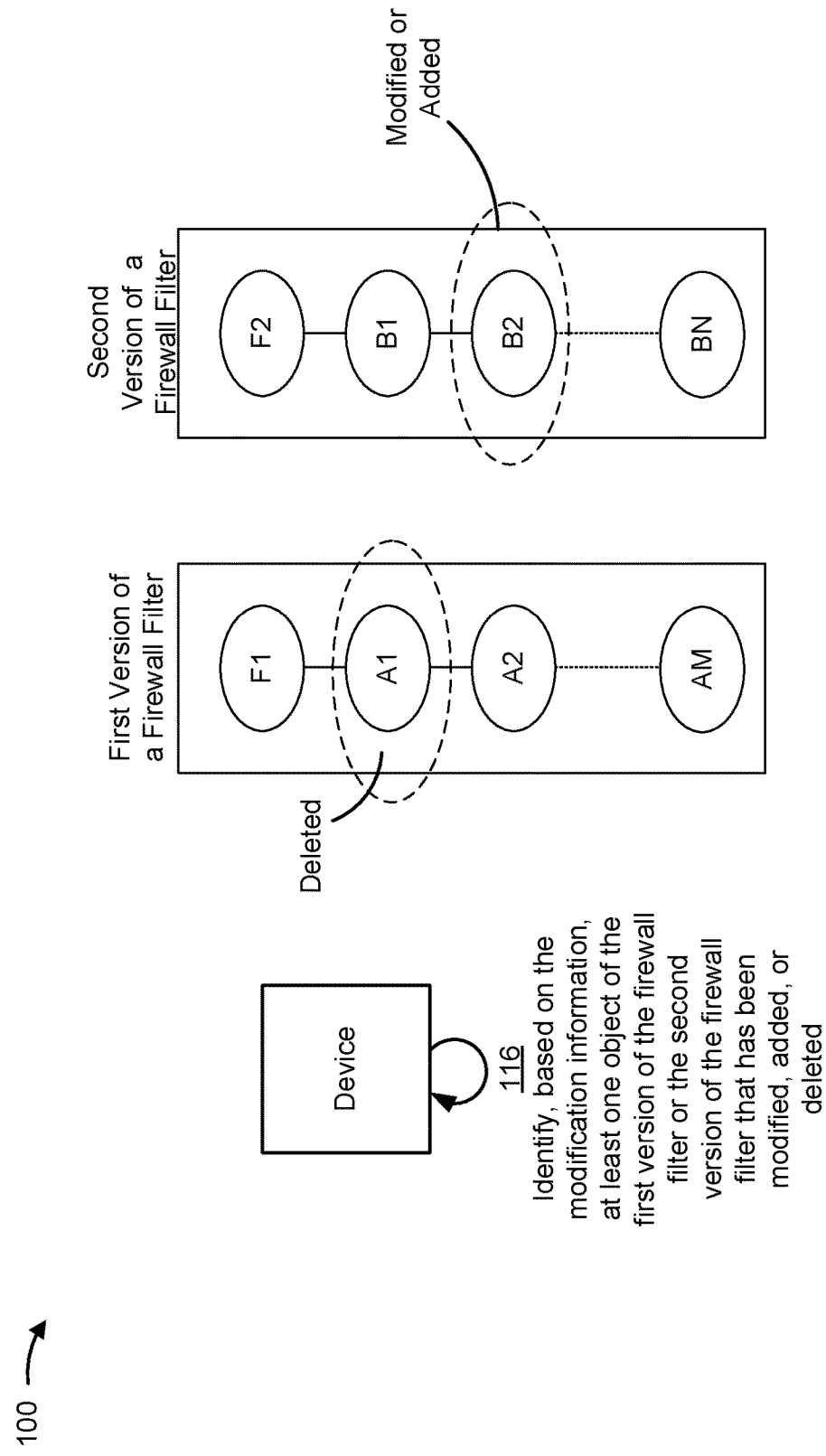

As shown in FIG. 1D and by reference number 116, the device may identify, based on the modification information, at least one object of the one or more first objects (e.g., the first version of the firewall filter) that has been deleted or at least one object of the one or more second objects (e.g., the second version of the firewall filter) that is a modification of a first object or has been added.

For example, the device may determine, based on the modification information, that a second firewall rule, of the set of second firewall rules, is a modification of a first firewall rule of the set of first firewall rules and may identify an object, of the one or more second objects, associated with the second firewall rule. As another example, the device may determine, based on the modification information, that a first firewall rule, of the set of first firewall rules, does not correspond to any second firewall rule of the set of second firewall rules (e.g., the first firewall rule has been deleted) and may identify an object, of the one or more first objects, associated with the first firewall rule. In another example, the device may determine, based on the modification information, that a second firewall rule does not correspond to any first firewall rule of the set of first firewall rules (e.g., the second firewall rule has been added) and may identify an object, of the one or more second objects, associated with the second firewall rule.

In a particular example, as shown in FIG. 1D, the device may determine, based on the modification information, that object A1 from the example first version of the firewall filter has been deleted from the firewall filter (e.g., when updating the firewall filter from the first version to the second version). Further, the device may determine, based on the modification information, that object B2 of the example second version of the firewall filter is a modification (e.g., of a first object of the one or more first objects) or has been added to the firewall filter (e.g., when updating the firewall filter from the first version to the second version).

Figure 1E:
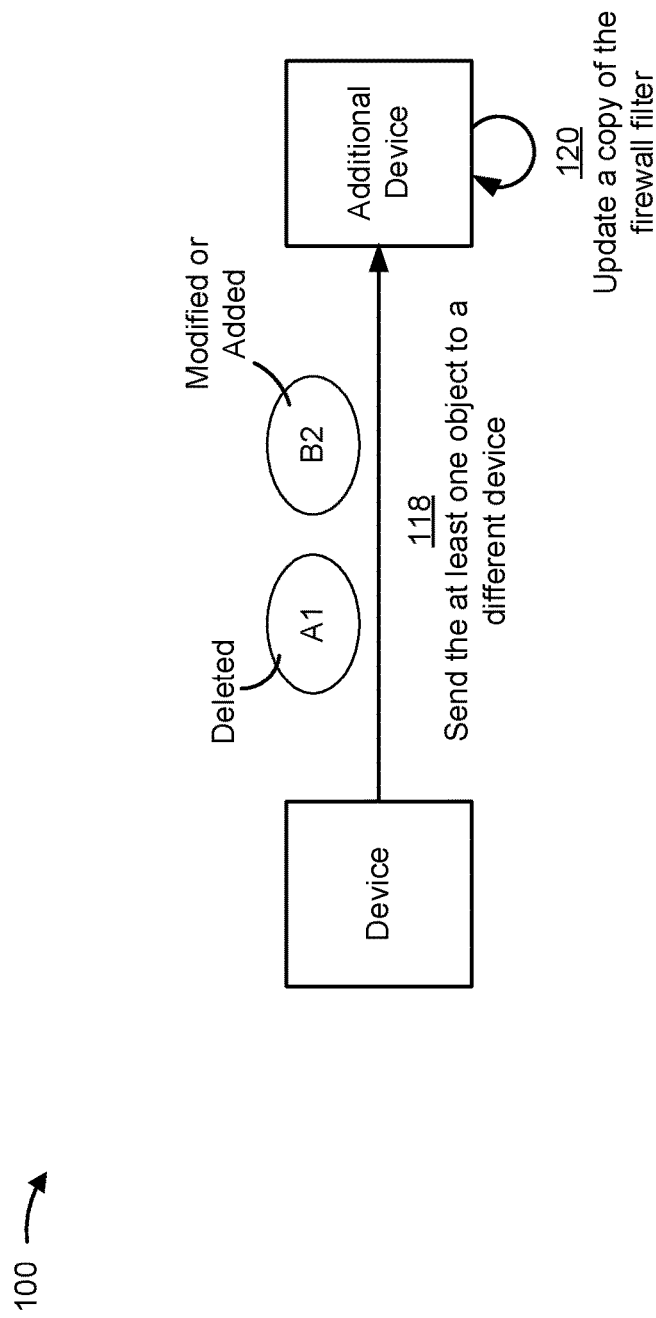

As shown in FIG. 1E and by reference number 118, the device may send the at least one object to the additional device. For example, as shown in FIG. 1E, the device may send object A1 (e.g., the object that was deleted from the example first version of the firewall filter) and/or the object B2 (e.g., the object is a modification of an object of the example first version of the firewall filter and/or was added to the example second version of the firewall filter). In some implementations, the device may send the at least one object to the additional device without sending at least one other object, of the one or more first objects and the one or more second objects, that is not a modification and has not been added or deleted. For example, the device may send objects A1 and B2, but not objects A2 through AM and objects B2 through BN, because objects A2 through AM and objects B2 through BN are not modifications and have not been added, or deleted. Additionally, or alternatively, the device may send the modification information to the additional device.

As shown by reference number 120, the additional device may update a copy of the firewall filter (e.g., based on the at least one object and/or the modification information). In some implementations, the additional device may include a copy of the first version of the firewall filter (e.g., in a data structure of the additional device or in a data structure accessible to the additional device via the network) and the additional device may process the at least one object and/or the modification information to update the copy of the first version of the firewall filter to the second version of the firewall filter. For example, when the at least one object includes a first object, of the one or more first objects, the additional device may determine that the first object was deleted from the firewall filter and may delete a corresponding object in the copy of the first version of the firewall filter, as well as update any adjacent objects (e.g., to indicate that the first object does not precede or follow an adjacent object), to obtain the second version of the firewall filter.

As another example, when the at least one object includes a second object, of the one or more second objects, the additional device may search for a corresponding object in the copy of the first version of the firewall filter to determine whether the second object is a modification or was added. When the corresponding object is present, which may indicate that the second object is a modification, the additional device may update the corresponding object (e.g., to include the contents of the second object) to obtain the second version of the firewall filter. When the corresponding object is not present, which may indicate that the second object was added, the additional device may add the second object, as well as update any adjacent objects (e.g., to indicate that the second object precedes or follows an adjacent object), to obtain the second version of the firewall filter.

In another example, the additional device may process the modification information to determine one or more instructions. The one or more instructions may indicate that an object of the copy of the first version of the firewall filter is to be modified and/or deleted or that a new object is to be added. The additional device may execute the one or more instructions to update the copy of the first version of the firewall filter to the second version of the firewall filter.

As indicated above, FIGS. 1A-1E are provided merely as one or more examples. Other examples may differ from what is described with regard to FIGS. 1A-1E.

Figure 2:
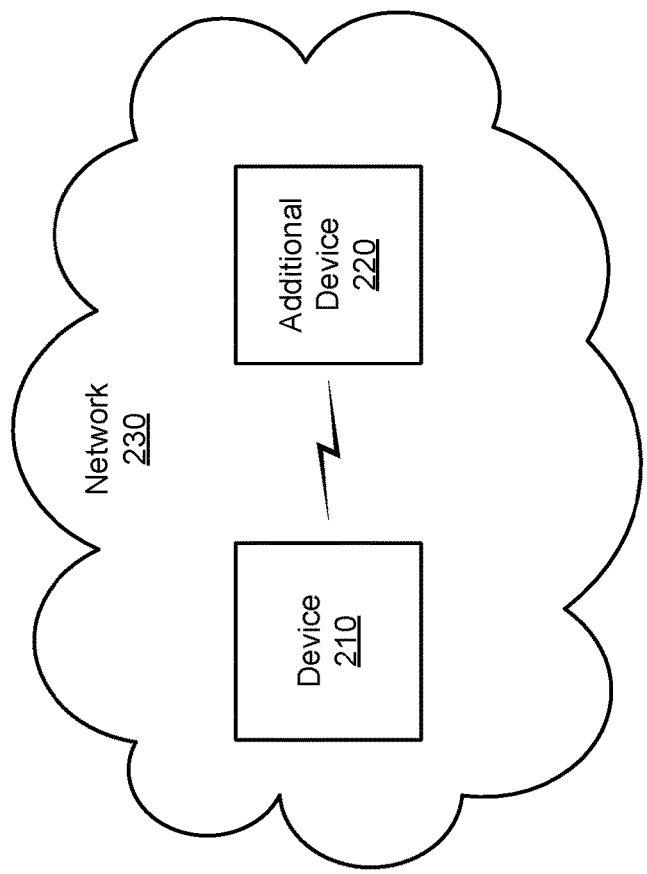
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include device 210, additional device 220, and network 230. Devices of environment 200 may interconnect via wired connections, wireless connections, or a combination of wired and wireless connections.

Device 210 includes one or more devices capable of receiving, storing, generating, processing, forwarding, and/or transferring traffic (e.g., one or more packets) in a manner described herein. For example, device 210 may include a router, a switch, a gateway, a firewall device, a modem, a hub, a bridge, a network interface controller (MC), a reverse proxy, a server (e.g., a proxy server), a multiplexer, a security device, an intrusion detection device, a load balancer, or a similar device. In some implementations, device 210 may be a physical device implemented within a housing, such as a chassis. In some implementations, device 210 may be a virtual device implemented by one or more computer devices of a cloud computing environment or a data center. In some implementations, device 210 may include and/or communicate with a data structure. In some implementations, device 210 may communicate with additional device 220.

Additional device 220 includes one or more devices capable of receiving, storing, generating, processing, forwarding, and/or transferring traffic (e.g., one or more packets) in a manner described herein. For example, additional device 220 may include a router, a switch, a gateway, a firewall device, a modem, a hub, a bridge, a NIC, a reverse proxy, a server, a multiplexer, a security device, an intrusion detection device, a load balancer, or a similar device. In some implementations, additional device 220 may be a physical device implemented within a housing, such as a chassis. In some implementations, additional device 220 may be a virtual device implemented by one or more computer devices of a cloud computing environment or a data center. In some implementations, device 210 may include and/or communicate with a data structure. In some implementations, additional device 220 may communicate with device 210.

Network 230 includes one or more wired and/or wireless networks. For example, network 230 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
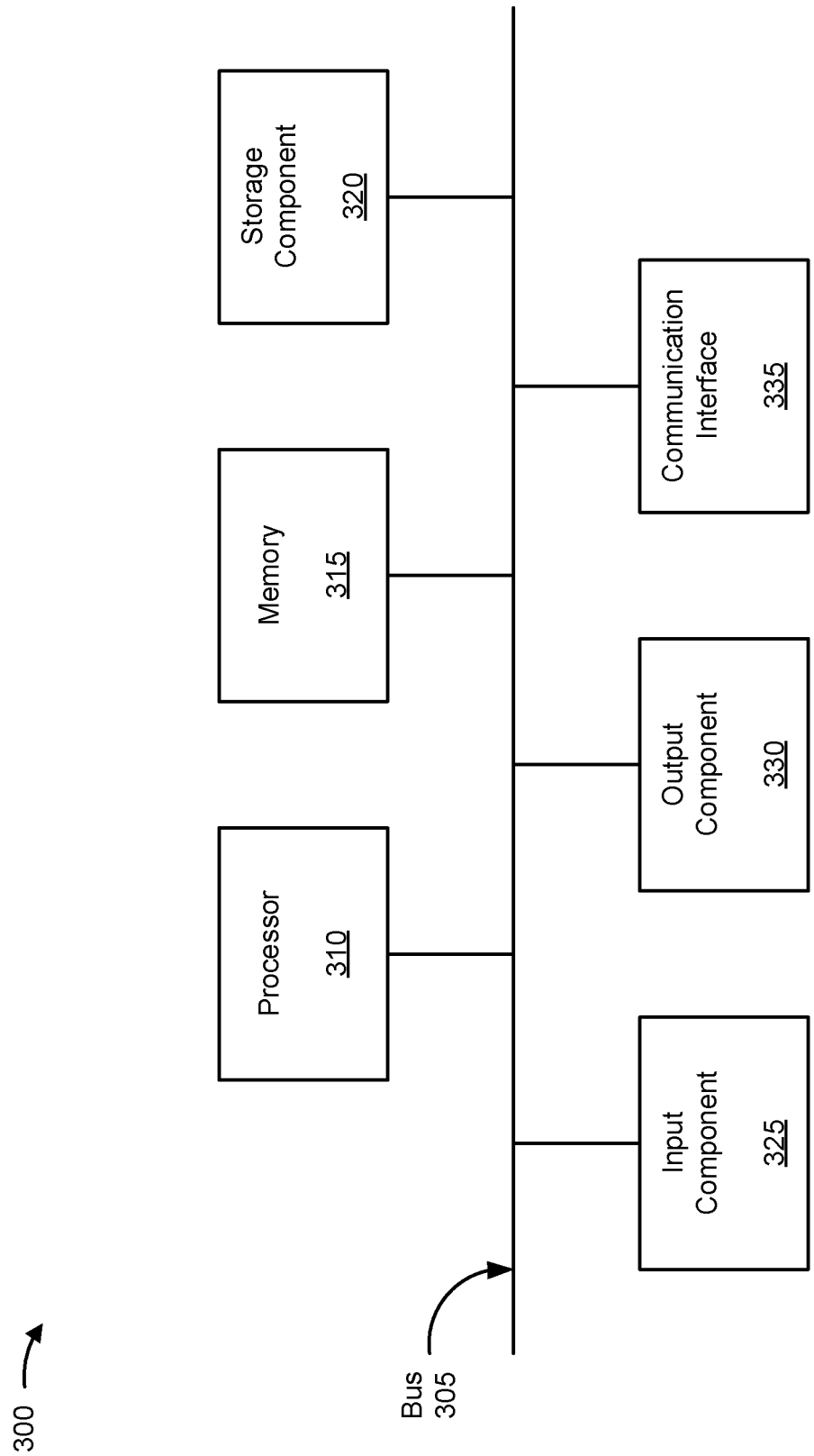
FIGS. 3A and 3B are diagrams of example components of one or more devices of FIG. 2.
Figure 3B:
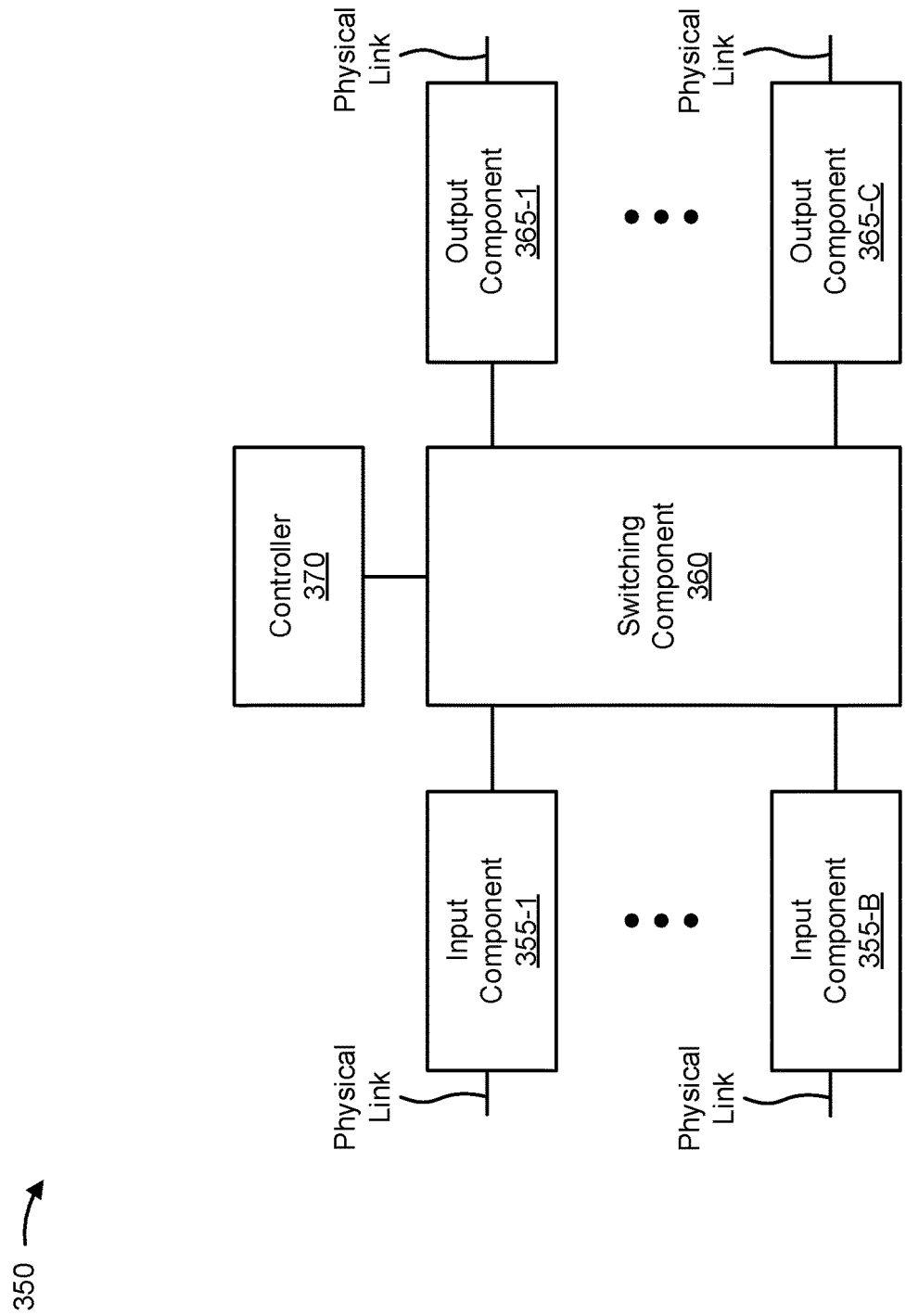

FIGS. 3A-3B are diagrams of example components of one or more devices of FIG. 2. FIG. 3A is a diagram of example components of a device 300. Device 300 may correspond to device 210, additional device 220, and/or the like. In some implementations, device 210, additional device 220, and/or the like may include one or more devices 300 and/or one or more components of device 300. As shown in FIG. 3A, device 300 may include a bus 305, a processor 310, a memory 315, a storage component 320, an input component 325, an output component 330, and a communication interface 335.

Bus 305 includes a component that permits communication among the components of device 300. Processor 310 is implemented in hardware, firmware, or a combination of hardware and software. Processor 310 takes the form of a central processing unit (CPU), a graphics processing unit (GPU), an accelerated processing unit (APU), a microprocessor, a microcontroller, a digital signal processor (DSP), a field-programmable gate array (FPGA), an ASIC, or another type of processing component. In some implementations, processor 310 includes one or more processors capable of being programmed to perform a function. Memory 315 includes a random access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a sensor for sensing information (e.g., a global positioning system (GPS) component, an accelerometer, a gyroscope, and/or an actuator). Output component 330 includes a component that provides output information from device 300 (e.g., a display, a speaker, and/or one or more light-emitting diodes (LEDs)).

Communication interface 335 includes a transceiver-like component (e.g., a transceiver and/or a separate receiver and transmitter) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

FIG. 3B is a diagram of example components of a device 350. Device 350 may correspond to device 210, additional device 220, and/or the like. In some implementations, device 210, additional device 220, and/or the like may include one or more devices 350 and/or one or more components of device 350. As shown in FIG. 3B, device 350 may include one or more input components 355-1 through 355-B (B≥1) (hereinafter referred to collectively as input components 355, and individually as input component 355), a switching component 360, one or more output components 365-1 through 365-C (C≥1) (hereinafter referred to collectively as output components 365, and individually as output component 365), and a controller 370.

Input component 355 may be points of attachment for physical links and may be points of entry for incoming traffic, such as packets. Input component 355 may process incoming traffic, such as by performing data link layer encapsulation or decapsulation. In some implementations, input component 355 may send and/or receive packets. In some implementations, input component 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical links. Output component 365 may support data link layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., and input/output component may be a combination of input component 355 and output component 365).

Controller 370 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 370 may include one or more processors that can be programmed to perform a function.

In some implementations, controller 370 may include a RAM, a ROM, and/or another type of dynamic or static storage device (e.g., a flash memory, a magnetic memory, an optical memory, etc.) that stores information and/or instructions for use by controller 370.

In some implementations, controller 370 may communicate with other devices, networks, and/or systems connected to device 300 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as an example. In practice, device 350 may include additional components, fewer components, different components, or differently arranged components than those shown in FIG. 3B. Additionally, or alternatively, a set of components (e.g., one or more components) of device 350 may perform one or more functions described as being performed by another set of components of device 350.

FIG. 4 is a flowchart of an example process 400 for a firewall filter comprising one or more objects. In some implementations, one or more process blocks of FIG. 4 may be performed by a device (e.g., device 210). In some implementations, one or more process blocks of FIG. 4 may be performed by another device or a group of devices separate from or including the device, such as an additional device (e.g., additional device 220) and/or the like.

As shown in FIG. 4, process 400 may include identifying a first version of a firewall filter that comprises one or more first objects and a second version of the firewall filter that comprises one or more second objects (block 410). For example, the device (e.g., using processor 310, memory 315, storage component 320, input component 325, output component 330, communication interface 335, input component 355, switching component 360, output component 365, controller 370, and/or the like) may identify a first version of a firewall filter that comprises one or more first objects and a second version of the firewall filter that comprises one or more second objects, as described above.

As further shown in FIG. 4, process 400 may include determining, based on the one or more first objects, a set of first firewall rules associated with the first version of the firewall filter (block 420). For example, the device (e.g., using processor 310, memory 315, storage component 320, input component 325, output component 330, communication interface 335, input component 355, switching component 360, output component 365, controller 370, and/or the like) may determine, based on the one or more first objects, a set of first firewall rules associated with the first version of the firewall filter, as described above.

As further shown in FIG. 4, process 400 may include determining, based on the one or more second objects, a set of second firewall rules associated with the second version of the firewall filter (block 430). For example, the device (e.g., using processor 310, memory 315, storage component 320, input component 325, output component 330, communication interface 335, input component 355, switching component 360, output component 365, controller 370, and/or the like) may determine, based on the one or more second objects, a set of second firewall rules associated with the second version of the firewall filter, as described above.

As further shown in FIG. 4, process 400 may include determining, based on the set of first firewall rules and the set of second firewall rules, modification information related to the firewall filter, wherein the modification information indicates at least one difference between the set of first firewall rules and the set of second firewall rules (block 440). For example, the device (e.g., using processor 310, memory 315, storage component 320, input component 325, output component 330, communication interface 335, input component 355, switching component 360, output component 365, controller 370, and/or the like) may determine, based on the set of first firewall rules and the set of second firewall rules, modification information related to the firewall filter, as described above. In some implementations, the modification information indicates at least one difference between the set of first firewall rules and the set of second firewall rules.

As further shown in FIG. 4, process 400 may include identifying, based on the modification information, at least one object, of the one or more first objects or the one or more second objects, that is a modification or has been added or deleted (block 450). For example, the device (e.g., using processor 310, memory 315, storage component 320, input component 325, output component 330, communication interface 335, input component 355, switching component 360, output component 365, controller 370, and/or the like) may identify, based on the modification information, at least one object, of the one or more first objects or the one or more second objects, that is a modification or has been added or deleted, as described above.

As further shown in FIG. 4, process 400 may include sending the at least one object to an additional device without sending at least one other object of the one or more first objects and the one or more second objects, wherein the at least one other object is not a modification and has not been added or deleted (block 460). For example, the device (e.g., using processor 310, memory 315, storage component 320, input component 325, output component 330, communication interface 335, input component 355, switching component 360, output component 365, controller 370, and/or the like) may send the at least one object to an additional device without sending at least one other object of the one or more first objects and the one or more second objects, as described above. In some implementations, the at least one other object is not a modification and has not been added or deleted.

Process 400 may include additional implementations, such as any single implementation or any combination of implementations described below and/or in connection with one or more other processes described elsewhere herein.

In a first implementation, each object, of the one or more first objects and the one or more second objects, respectively comprises a firewall rule that includes a term, at least one match condition that specifies packet filtering criteria, and an action that a firewall is to perform when the packet filtering criteria are satisfied.

In a second implementation, alone or in combination with the first implementation, determining the set of second firewall rules associated with the second version of the firewall filter comprises determining at least one respective second firewall rule associated with each second object of the one or more second objects.

In a third implementation, alone or in combination with one or more of the first and second implementations, determining the modification information related to the firewall filter comprises comparing the set of first firewall rules and the set of second firewall rules to identify one or more differences between the set of first firewall rules and the set of second firewall rules.

In a fourth implementation, alone or in combination with one or more of the first through third implementations, the modification information related to the firewall filter indicates that a second firewall rule, of the set of second firewall rules, is a modification of a first firewall rule of the set of first firewall rules; a first firewall rule, of the set of first firewall rules, does not correspond to any second firewall rule of the set of second firewall rules; or a second firewall rule, of the set of second firewall rules, does not correspond to any first firewall rule of the set of first firewall rules.

In a fifth implementation, alone or in combination with one or more of the first through fourth implementations, identifying the at least one object, of the one or more first objects and the one or more second objects, that is a modification or has been added or deleted comprises determining, based on the modification information, that a second firewall rule, of the set of second firewall rules, is a modification of a first firewall rule of the set of first firewall rules or that the second firewall rule does not correspond to any first firewall rule of the set of first firewall rules, and identifying an object, of the one or more second objects, associated with the second firewall rule.

In a sixth implementation, alone or in combination with one or more of the first through fifth implementations, identifying the at least one object, of the one or more first objects and the one or more second objects, that is a modification or has been added or deleted comprises determining, based on the modification information, that a first firewall rule, of the set of first firewall rules, does not correspond to any second firewall rule of the set of second firewall rules, and identifying an object, of the one or more first objects, associated with the first firewall rule.

In a seventh implementation, alone or in combination with one or more of the first through sixth implementations, the additional device includes a copy of the first version of the firewall filter and sending the at least one object to the additional device allows the additional device to update the copy of the first version of the firewall filter to the second version of the firewall filter.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flowchart of an example process 500 for a firewall filter comprising one or more objects. In some implementations, one or more process blocks of FIG. 5 may be performed by a device (e.g., device 210). In some implementations, one or more process blocks of FIG. 5 may be performed by another device or a group of devices separate from or including the device, such as an additional device (e.g., additional device 220) and/or the like.

As shown in FIG. 5, process 500 may include identifying a first version of a firewall filter that includes one or more first objects, wherein each first object, of the one or more first objects, includes a respective firewall rule (block 510). For example, the device (e.g., using processor 310, memory 315, storage component 320, input component 325, output component 330, communication interface 335, input component 355, switching component 360, output component 365, controller 370, and/or the like) may identify a first version of a firewall filter that includes one or more first objects, as described above. In some implementations, each first object, of the one or more first objects, includes a respective firewall rule.

As further shown in FIG. 5, process 500 may include identifying a second version of the firewall filter that includes one or more second objects, wherein each second object, of the one or more second objects, includes a respective firewall rule (block 520). For example, the device (e.g., using processor 310, memory 315, storage component 320, input component 325, output component 330, communication interface 335, input component 355, switching component 360, output component 365, controller 370, and/or the like) may identify a second version of the firewall filter that includes one or more second objects, as described above. In some implementations, each second object, of the one or more second objects, includes a respective firewall rule.

As further shown in FIG. 5, process 500 may include determining one or more differences between the first version of the firewall filter and the second version of the firewall filter (block 530). For example, the device (e.g., using processor 310, memory 315, storage component 320, input component 325, output component 330, communication interface 335, input component 355, switching component 360, output component 365, controller 370, and/or the like) may determine one or more differences between the first version of the firewall filter and the second version of the firewall filter, as described above.

As further shown in FIG. 5, process 500 may include identifying, based on the one or more differences between the first version of the firewall filter and the second version of the firewall filter, at least one object of the one or more first objects or the one or more second objects (block 540). For example, the device (e.g., using processor 310, memory 315, storage component 320, input component 325, output component 330, communication interface 335, input component 355, switching component 360, output component 365, controller 370, and/or the like) may identify, based on the one or more differences between the first version of the firewall filter and the second version of the firewall filter, at least one object of the one or more first objects or the one or more second objects, as described above.

As further shown in FIG. 5, process 500 may include sending the at least one object to an additional device to cause the additional device to update a copy of the firewall filter, without sending at least one other object of the one or more first objects and the one or more second objects (block 550). For example, the device (e.g., using processor 310, memory 315, storage component 320, input component 325, output component 330, communication interface 335, input component 355, switching component 360, output component 365, controller 370, and/or the like) may send the at least one object to an additional device to cause the additional device to update a copy of the firewall filter, without sending at least one other object of the one or more first objects and the one or more second objects, as described above.

Process 500 may include additional implementations, such as any single implementation or any combination of implementations described below and/or in connection with one or more other processes described elsewhere herein.

In a first implementation, each first object, of the one or more first objects, further includes information that identifies the firewall filter and information that identifies the first version of the firewall filter.

In a second implementation, alone or in combination with the first implementation, when determining the one or more differences between the first version of the firewall filter and the second version of the firewall filter, process 500 includes identifying a set of first firewall rules associated with the first version of the firewall filter; identifying a set of second firewall rules associated with the second version of the firewall filter; and determining that: a second firewall rule, of the set of second firewall rules, is a modification of a first firewall rule of the set of first firewall rules; a first firewall rule, of the set of first firewall rules, does not correspond to any second firewall rule of the set of second firewall rules; or a second firewall rule, of the set of second firewall rules, does not correspond to any first firewall rule of the set of first firewall rules.

In a third implementation, alone or in combination with one or more of the first and second implementations, when determining the one or more differences between the first version of the firewall filter and the second version of the firewall filter, process 500 includes determining that a firewall rule associated with a second object, of the one or more second objects, is a modification of a firewall rule associated with a first object of the one or more first objects; determining that a firewall rule associated with a first object, of the one or more first objects, does not correspond to any firewall rule associated with the one or more second objects; or determining that a firewall rule associated with a second object, of the one or more second objects, does not correspond to any firewall rule associated with the one or more first objects.

In a fourth implementation, alone or in combination with one or more of the first through third implementations, when identifying the at least one object of the one or more first objects and the one or more second objects, process 500 includes processing the one or more differences to identify at least one firewall rule that has been deleted and identifying at least one object, of the one or more first objects, associated with the at least one firewall rule.

In a fifth implementation, alone or in combination with one or more of the first through fourth implementations, when identifying the at least one object of the one or more first objects and the one or more second objects, process 500 includes processing the one or more differences to identify at least one firewall rule that has been added or is a modification, and identifying at least one object, of the one or more second objects, associated with the at least one firewall rule.

In a sixth implementation, alone or in combination with one or more of the first through fifth implementations, sending the at least one object to the additional device causes the additional device to update the copy of the firewall filter from the first version of the firewall filter to the second version of the firewall filter.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flowchart of an example process 600 for a firewall filter comprising one or more objects. In some implementations, one or more process blocks of FIG. 6 may be performed by a firewall device (e.g., device 210). In some implementations, one or more process blocks of FIG. 6 may be performed by another device or a group of devices separate from or including the device, such as an additional firewall device (e.g., additional device 220) and/or the like.

As shown in FIG. 6, process 600 may include identifying a first version of a firewall filter that comprises a plurality of first objects and a second version of the firewall filter that comprises a plurality of second objects (block 610). For example, the firewall device (e.g., using processor 310, memory 315, storage component 320, input component 325, output component 330, communication interface 335, input component 355, switching component 360, output component 365, controller 370, and/or the like) may identify a first version of a firewall filter that comprises a plurality of first objects and a second version of the firewall filter that comprises a plurality of second objects, as described above.

As further shown in FIG. 6, process 600 may include determining, based on the plurality of first objects, first information related to the first version of the firewall filter (block 620). For example, the firewall device (e.g., using processor 310, memory 315, storage component 320, input component 325, output component 330, communication interface 335, input component 355, switching component 360, output component 365, controller 370, and/or the like) may determine, based on the plurality of first objects, first information related to the first version of the firewall filter, as described above.

As further shown in FIG. 6, process 600 may include determining, based on the plurality of second objects, second information related to the second version of the firewall filter (block 630). For example, the firewall device (e.g., using processor 310, memory 315, storage component 320, input component 325, output component 330, communication interface 335, input component 355, switching component 360, output component 365, controller 370, and/or the like) may determine, based on the plurality of second objects, second information related to the second version of the firewall filter, as described above.

As further shown in FIG. 6, process 600 may include determining, based on the first information and the second information, modification information related to the firewall filter, wherein the modification information indicates at least one difference between the first information and the second information (block 640). For example, the firewall device (e.g., using processor 310, memory 315, storage component 320, input component 325, output component 330, communication interface 335, input component 355, switching component 360, output component 365, controller 370, and/or the like) may determine, based on the first information and the second information, modification information related to the firewall filter, as described above. In some implementations, the modification information indicates at least one difference between the first information and the second information.

As further shown in FIG. 6, process 600 may include identifying, based on the modification information, at least one object of the plurality of first objects or the plurality of second objects that is a modification or has been added or deleted (block 650). For example, the firewall device (e.g., using processor 310, memory 315, storage component 320, input component 325, output component 330, communication interface 335, input component 355, switching component 360, output component 365, controller 370, and/or the like) may identify, based on the modification information, at least one object of the plurality of first objects or the plurality of second objects that is a modification or has been added or deleted, as described above.

As further shown in FIG. 6, process 600 may include sending information identifying the at least one object, and not any other object of the plurality of first objects or the plurality of second objects, and the modification information to an additional firewall device (block 660). For example, the firewall device (e.g., using processor 310, memory 315, storage component 320, input component 325, output component 330, communication interface 335, input component 355, switching component 360, output component 365, controller 370, and/or the like) may send information identifying the at least one object, and not any other object of the plurality of first objects or the plurality of second objects, and the modification information to an additional firewall device, as described above.

Process 600 may include additional implementations, such as any single implementation or any combination of implementations described below and/or in connection with one or more other processes described elsewhere herein.

In a first implementation, the plurality of first objects are in a sequential priority order and a first object, of the plurality of first objects, includes information that identifies a preceding first object that is before the first object in the sequential priority order or a following first object that is after the first object in the sequential priority order.

In a second implementation, alone or in combination with the first implementation, the plurality of second objects are in a sequential priority order and a second object, of the plurality of second objects, comprises a firewall rule, information indicating that the second object is included in the second version of the firewall filter, and information identifying one or more additional second objects, of the plurality of second objects, that are adjacent to the second object in the sequential priority order.

In a third implementation, alone or in combination with one or more of the first and second implementations, the first information identifies a set of first firewall rules included in the first version of the firewall filter and the second information identifies a set of second firewall rules included in the second version of the firewall filter.

In a fourth implementation, alone or in combination with one or more of the first through third implementations, when determining the modification information related to the firewall filter, process 600 includes identifying, based on the first information, a set of first firewall rules included in the first version of the firewall filter; identifying, based on the second information, a set of second firewall rules included in the second version of the firewall filter; and processing the set of first firewall rules and the set of second firewall rules to identify one or more differences between the set of first firewall rules and the set of second firewall rules.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
identifying, by a device, a first version of a firewall filter that comprises a plurality of first objects and a second version of the firewall filter that comprises a plurality of second objects,
wherein the plurality of first objects and/or the plurality of second objects are in a sequential priority order, and
wherein:
a first object, of the plurality of first objects, includes first object information identifying an additional first object, of the plurality of first objects, adjacent to the first object, and/or
a second object, of the plurality of second objects, includes second object information identifying an additional second object, of the plurality of second objects, adjacent to the second object;
determining, by the device and based on the plurality of first objects, a set of first firewall rules associated with the first version of the firewall filter;
determining, by the device and based on the plurality of second objects, a set of second firewall rules associated with the second version of the firewall filter;
determining, by the device and based on the set of first firewall rules and the set of second firewall rules, modification information related to the firewall filter,
wherein the modification information indicates at least one difference between the set of first firewall rules and the set of second firewall rules;
identifying, by the device and based on the modification information, at least one object, of the plurality of first objects or the plurality of second objects, that has been modified, added, or deleted; and
sending, by the device, the at least one object to an additional device without sending at least one other object of the plurality of first objects or the plurality of second objects,
wherein the at east one other object has not been modified, added, or deleted.

2. The method of claim 1, wherein each object, of the plurality of first objects and the plurality of second objects, comprises a third firewall rule, and
wherein the third firewall rule includes:
a term,
at least one match condition that specifies packet filtering criteria, and
an action that a firewall is to perform when the packet filtering criteria are satisfied.

3. The method of claim 1, wherein determining the set of second firewall rules associated with the second version of the firewall filter comprises:
determining at least one second firewall rule associated with each second object of the plurality of second objects.

4. The method of claim 1, wherein determining the modification information related to the firewall filter comprises:
comparing the set of first firewall rules to the set of second firewall rules to identify the difference between the set of first firewall rules and the set of second firewall rules.

5. The method of claim 1, wherein the modification information related to the firewall filter indicates that at least one of:
a second firewall rule, of the set of second firewall rules, is a modification of a first firewall rule of the set of first firewall rules;
the first firewall rule, of the set of first firewall rules, does not correspond to any second firewall rule of the set of second firewall rules; or
the second firewall rule, of the set of second firewall rules, does not correspond to any first firewall rule of the set of first firewall rules.

6. The method of claim 1, wherein identifying the at least one object, of the plurality of first objects or the plurality of second objects, that has been modified, added, or deleted comprises:
determining, based on the modification information, that a second firewall rule, of the set of second firewall rules, is a modification of a first firewall rule of the set of first firewall rules or that the second firewall rule does not correspond to any first firewall rule of the set of first firewall rules; and
identifying that the at least one object, of the plurality of second objects, is associated with the second firewall rule.

7. The method of claim 1, wherein identifying the at least one object, of the plurality of first objects or the plurality of second objects, that has been modified, added, or deleted comprises:
determining, based on the modification information, that a first firewall rule, of the set of first firewall rules, does not correspond to any second firewall rule of the set of second firewall rules; and
identifying that the at least one object, of the plurality of first objects, is associated with the first firewall rule.

8. The method of claim 1, wherein the additional device includes a copy of the first version of the firewall filter, and
wherein sending the at least one object to the additional device allows the additional device to update the copy of the first version of the firewall filter to the second version of the firewall filter.

9. A device, comprising:
one or more memories; and
one or more processors to:
identify a first version of a firewall filter that includes a plurality of first objects,
wherein each first object, of the plurality of first objects, includes a first firewall rule;
identify a second version of the firewall filter that includes a plurality of second objects,
wherein each second object, of the plurality of second objects, includes a second firewall rule,
wherein the plurality of first objects and/or the plurality of second objects are in a sequential priority order, and wherein:
a first object, of the plurality of first objects, includes first object information identifying an additional first object, of the plurality of first objects, adjacent to the first object, and/or
a second object, of the plurality of second objects, includes second object information identifying an additional second object, of the plurality of second objects, adjacent to the second object;
determine one or more differences between the first version of the firewall filter and the second version of the firewall filter;
identify, based on the one or more differences between the first version of the firewall filter and the second version of the firewall filter, at least one object of the plurality of first objects or the plurality of second objects; and
send the at least one object to an additional device to cause the additional device to update a copy of the firewall filter without sending at least one other object of the plurality of first objects or the plurality of second objects.

10. The device of claim 9, wherein the first object information, of each first object of the one or more first objects, includes firewall filter information, identifying the firewall filter, and first version information identifying the first version of the firewall filter.

11. The device of claim 9, wherein the one or more processors, when determining the one or more differences between the first version of the firewall filter and the second version of the firewall filter, are to:
identify a set of third firewall rules associated with the first version of the firewall filter;
identify a set of fourth firewall rules associated with the second version of the firewall filter; and
determine that:
a fourth firewall rule, of the set of fourth firewall rules, is a modification of a third firewall rule of the set of third firewall rules,
the third firewall rule, of the set of third firewall rules, does not correspond to any fourth firewall rule of the set of fourth firewall rules, or
the fourth firewall rule, of the set of fourth firewall rules, does not correspond to any third firewall rule of the set of third firewall rules.

12. The device of claim 9, wherein the one or more processors, when determining the one or more differences between the first version of the firewall filter and the second version of the firewall filter, are to:
determine that the second firewall rule, associated with the second object of the plurality of second objects, is a modification of the first firewall rule associated with the first object of the plurality of first objects;
determine that the first firewall rule, associated with the first object of the plurality of first objects, does not correspond to any second firewall rule associated with the plurality of second objects; or
determine that the second firewall rule, associated with the second object of the plurality of second objects, does not correspond to any first firewall rule associated with the plurality of first objects.

13. The device of claim 9, wherein the one or more processors, when identifying the at least one object of the plurality of first objects or the plurality of second objects, are to:
process the one or more differences to identify at least one firewall rule of the first firewall rule, associated with each first object of the plurality of first objects, or of the second firewall rule, associated with each second object of the plurality of second objects, that has been deleted; and
identify that the first object, of the plurality of first objects, is associated with the at least one firewall rule.

14. The device of claim 9, wherein the one or more processors, when identifying the at least one object of the plurality of first objects or the plurality of second objects, are to:
process the one or more differences to identify at least one firewall rule of the first firewall rule, associated with each first object of the plurality of first objects, or of the second firewall rule, associated with each second object of the plurality of second objects, that has been added or modified; and
identify that the second object, of the plurality of second objects, is associated with the at least one firewall rule.

15. The device of claim 9, wherein sending the at least one object to the additional device causes the additional device to update the copy of the firewall filter from the first version of the firewall filter to the second version of the firewall filter.

16. A non-transitory computer-readable medium storing instructions, the instructions comprising:
one or more instructions that, when executed by one or more processors of a firewall device, cause the one or more processors to:
identify a first version of a firewall filter that comprises a plurality of first objects and a second version of the firewall filter that comprises a plurality of second objects,
wherein the plurality of first objects and/or the plurality of second objects are in a sequential priority order, and wherein:
a first object, of the plurality of first objects, includes first object information identifying an additional first object, of the plurality of first objects, adjacent to the first object, and/or
a second object, of the plurality of second objects, includes second object information including an additional second object, of the plurality of second objects, adjacent to the second object;
determine, based on the plurality of first objects, first filter information related to the first version of the firewall filter;
determine, based on the plurality of second objects, second filter information related to the second version of the firewall filter;
determine, based on the first filter information and the second filter information, modification information related to the firewall filter, wherein the modification information indicates at least one difference between the first filter information and the second filter information;

identify, based on the modification information, at least one object of the plurality of first objects or the plurality of second objects has been modified, added, or deleted; and send information identifying the at least one object, and not any other object of the plurality of first objects or the plurality of second objects, and the modification information to an additional firewall device.

17. The non-transitory computer-readable medium of claim 16, wherein the plurality of first objects are in the sequential priority order, and wherein the first object information, of the first object of the plurality of first objects, further includes preceding first object information, identifying a preceding first object that is before the first object in the sequential priority order, or following first object information identifying a following first object that is after the first object in the sequential priority order.

18. The non-transitory computer-readable medium of claim 16, wherein the plurality of second objects are in the sequential priority order, wherein the second object information, of the second object of the plurality of second objects, further includes firewall rule information, identifying a firewall rule, and second version information indicating that the second object is included in the second version of the firewall filter.

19. The non-transitory computer-readable medium of claim 16, wherein the first filter information identifies a set of first firewall rules included in the first version of the firewall filter, and wherein the second filter information identifies a set of second firewall rules included in the second version of the firewall filter.

20. The non-transitory computer-readable medium of claim 16, wherein the one or more instructions, that cause the one or more processors to determine the modification information related to the firewall filter, cause the one or more processors to:

identify, based on the first filter information, a set of first firewall rules included in the first version of the firewall filter;

identify, based on the second filter information, a set of second firewall rules included in the second version of the firewall filter; and process the set of first firewall rules and the set of second firewall rules to identify one or more differences between the set of first firewall rules and the set of second firewall rules.

\* \* \* \* \*